US012279286B2

United States Patent
Hu

(10) Patent No.: US 12,279,286 B2
(45) Date of Patent: Apr. 15, 2025

(54) INFORMATION TRANSMISSION METHOD AND APPARATUS, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Rongyi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 383 days.

(21) Appl. No.: 17/847,340

(22) Filed: Jun. 23, 2022

(65) Prior Publication Data

US 2022/0330228 A1    Oct. 13, 2022

Related U.S. Application Data

(63) Continuation of application No. PCT/CN2019/127958, filed on Dec. 24, 2019.

(51) Int. Cl.
*H04W 8/22* (2009.01)
*H04W 8/24* (2009.01)
(Continued)

(52) U.S. Cl.
CPC ....... *H04W 72/51* (2023.01); *H04W 72/0446* (2013.01); *H04W 36/00837* (2018.08); *H04W 92/18* (2013.01)

(58) Field of Classification Search
None
See application file for complete search history.

(56) References Cited

U.S. PATENT DOCUMENTS

2015/0215982 A1    7/2015  Siomina et al.
2017/0041971 A1 *  2/2017  Kim ............... H04W 76/14
(Continued)

FOREIGN PATENT DOCUMENTS

CN    109565837 A    4/2019
CN    109952790 A    6/2019
(Continued)

OTHER PUBLICATIONS

Extended European Search Report issued in corresponding European application No. 19957523.4, mailed Nov. 25, 2022.
(Continued)

*Primary Examiner* — Ajit Patel
(74) *Attorney, Agent, or Firm* — BAYES PLLC

(57) ABSTRACT

The present application relates to an information transmission method and apparatus, an electronic device, and a storage medium. Scenario information indicating a communication scenario corresponding to a first device is obtained, and capability indication information indicating a transition duration capability supported by the first device is sent to a second device according to the scenario information, so that when demodulating a signal sent by the first device, the second device demodulates or decides whether to demodulate the signal according to an actual transition duration of the first device, and the actual transition duration is usually a duration closely related to the first device itself, not a fixed duration stipulated by an agreement. Therefore, when demodulating the signal sent by the first device, the second device is enabled to flexibly perform demodulation according to the transition duration capabilities of different first devices, and the flexibility of signal demodulation is improved.

11 Claims, 4 Drawing Sheets

(51) Int. Cl.
  *H04W 72/0446* (2023.01)
  *H04W 72/51* (2023.01)
  *H04W 36/00* (2009.01)
  *H04W 92/18* (2009.01)

(56) References Cited

U.S. PATENT DOCUMENTS

| | | | |
|---|---|---|---|
| 2017/0303182 A1 | 10/2017 | Uchino et al. | |
| 2017/0367059 A1* | 12/2017 | Park | H04W 36/302 |
| 2018/0270714 A1* | 9/2018 | Martin | H04W 36/033 |
| 2019/0140864 A1 | 5/2019 | Gupta et al. | |
| 2019/0342838 A1 | 11/2019 | Kwak et al. | |

FOREIGN PATENT DOCUMENTS

| | | |
|---|---|---|
| CN | 110235375 A | 9/2019 |
| WO | 2017160131 A1 | 9/2017 |
| WO | 2018143882 A1 | 8/2018 |
| WO | 2018174802 A1 | 9/2018 |

OTHER PUBLICATIONS

Huawei et al., "Discussion on the switching period between 1Tx carrier and 2Tx carrier", R4-1914164, 3GPP TSG-RAN WG4 Meeting #93 Reno, USA, Nov. 18-22, 2019.

China Telecom, "Ad-hoc minutes on Tx switching between two uplink carriers", R4-1916082, 3GPP TSG-RAN WG4 Meeting #93 Reno, Nevada, US, Nov. 18-22, 2019.

Qualcomm Incorporated, "Location of transient period when a UE declares it's capability", R4-1912458, 3GPP TSG-RAN4 Meeting #92-bis Chongqing, CN.

China Telecom, "UE requirement to allow Tx switching between two uplink carriers", R4-1910793, 3GPP TSG-RAN WG4 Meeting #92bis Chongqing, China, Oct. 14-18, 2019.

3GPP TS 36.101 V15.7.0 (Jun. 2019); Technical Specification Group Radio Access Network; Evolved Universal Terrestrial Radio Access (E-UTRA); User Equipment (UE) radio transmission and reception (Release 15), 1817 pages.

International Search Report dated Sep. 24, 2020 from the International Searching Authority Re. Application No. PCT/CN2019/127958, 6 pages.

Written Opinion dated Sep. 24, 2020 from the International Searching Authority Re. Application No. PCT/CN2019/127958, 11 pages.

"UE RF requirements for EN-DC with UL sharing from UE perspective", Source: Huawei, HiSilicon, 3GPP TSG-RAN WG4 Meeting #86bis, R4-1803895, Melbourne, Australia, Apr. 16-20, 2018, 5 pages.

3GPP TS 38.101-1 V16.7.0 (Mar. 2021); Technical Specification Group Radio Access Network; NR; User Equipment (UE) radio transmission and reception; Part 1: Range 1 Standalone (Release 16), 430 pages.

3GPP TS 38.101-3 V16.7.0 (Mar. 2021); Technical Specification Group Radio Access Network; NR; User Equipment (UE) radio transmission and reception; Part 3: Range 1 and Range 2 Interworking operation with other radios (Release 16), 481 pages.

3GPP TS 38.331 V16.4.1 (Mar. 2021); Technical Specification Group Radio Access Network; NR; Radio Resource Control (RRC) protocol specification (Release 16), 946 pages.

First Office Action issued in corresponding European application No. 19957523.4, mailed Sep. 13, 2023.

Priority Review issued in corresponding Chinese application No. 202211425665.8, mailed May 30, 2024.

First Office Action issued in corresponding Chinese application No. 202211425665.8, mailed May 30, 2024.

Second Office Action issued in corresponding Chinese application No. 202211425665.8, mailed Aug. 10, 2024.

* cited by examiner

INFORMATION TRANSMISSION METHOD AND APPARATUS, ELECTRONIC DEVICE, AND STORAGE MEDIUM

CROSS-REFERENCE TO RELATED APPLICATION

This application is a continuation of International Application No. PCT/CN2019/127958, filed on Dec. 24, 2019, the entire contents of which are incorporated herein by reference.

TECHNICAL FIELD

The present application relates to the field of communications, and in particular, to an information transmission method, apparatus, electronic device and storage medium.

BACKGROUND

In the process of mobile data communication, power variation or resource block hopping (RB hopping) often occurs. For example, the communication signal is switched from a new generation mobile communication system (New Radio, NR for short) signal to a Long Term Evolution (LTE) signal. At this time, it is necessary to limit the switching time used for the switching of the communication signal, so as to avoid the problem of increasing the demodulation bit error rate due to power variation or resource block hopping. Based on this situation, a Time mask is introduced into the 3GPP protocol, and the time mask specifies some time constraints for switching from the signal in the original communication scenario to the new communication scenario, including: a transition period (Tp1) limit of the signal power changed from ON to OFF in the original communication scenario, a switching time limit for switching from a subframe or slot in the original communication scenario to a subframe or slot in the new communication scenario, and a transient period (Tp2) limit of the signal power from OFF to ON in the new communication scenario. Usually, the user terminal needs to perform signal switching and transmission according to the requirements of the above time mask.

In the conventional technology, the network device demodulates the communication signal based on the transition period and the switching time specified in the protocol, so as to reduce the bit error rate of signal demodulation caused by power variation or resource block hopping.

However, the conventional method of demodulating signals is not flexible enough.

SUMMARY

Based on this, the present application provides an information transmission method, apparatus, electronic device and storage medium.

In a first aspect, an information transmission method includes:
acquiring scenario information of a first device, where the scenario information is used for indicating a communication scenario corresponding to the first device; and
sending capability indication information to a second device according to the scenario information, where the capability indication information is used for indicating a transient period capability supported by the first device.

In a second aspect, an information transmission method includes:
receiving, by a second device, capability indication information sent by a first device; where the capability indication information is used for indicating to the second device a transient period capability supported by the first device; and
demodulating or determining whether to demodulate a signal sent by the first device according to the transient period capability.

In a third aspect, an information transmission apparatus includes:
an acquisition module, configured to acquire scenario information of a first device, where the scenario information is used for indicating a communication scenario corresponding to the first device; and
a sending module, configured to send capability indication information to a second device according to the scenario information, where the capability indication information is used for indicating a transient period capability supported by the first device.

In a fourth aspect, an information transmission apparatus includes:
a receiving module, configured to receive capability indication information sent by a first device; where the capability indication information is used for indicating to a second device a transient period capability supported by the first device; and
a demodulation module, configured to demodulate or determine whether to demodulate a signal sent by the first device according to the transient period capability.

In a fifth aspect, an electronic device includes a sender, a memory and a processor, the memory stores a computer program,
the processor executes the computer program for acquiring scenario information of a first device; where the scenario information is used for indicating a communication scenario corresponding to the first device;
the sender is configured to send capability indication information to a second device according to the scenario information, where the capability indication information is used for indicating a transient period capability supported by the first device.

In a sixth aspect, an electronic device includes: a receiver, a memory and a processor, the memory stores a computer program,
the receiver is configured to receive, by a second device, capability indication information sent by a first device; where the capability indication information is used for indicating to the second device a transient period capability supported by the first device; and
when executing the computer program, the processor is configured to demodulate or determine whether to demodulate a signal sent by the first device according to the transient period capability.

In a seventh aspect, there is provided a computer-readable storage medium on which a computer program is stored, the steps of the method of the first aspect are implemented when the computer program is executed by a processor, or the steps of the method of the second aspect are implemented when the computer program is executed by the processor.

In the above information transmission method, apparatus, electronic device and storage medium, by acquiring scenario information indicating a communication scenario corresponding to the first device, and sending capability indication information indicating the transient period capability supported by the first device to the second device according to the scenario information, when the second device demodulates the signal sent by the first device, it demodulates or determines whether to demodulate the signal according to the actual transient period of the first device, and the actual transient period is usually closely related to the first device itself, instead of a fixed duration specified in the protocol. Therefore, when the second device demodulates the signal sent by the first device, it can flexibly perform demodulation according to the transient period capability of each different first device, which improves the flexibility of signal demodulation.

DETAILED DESCRIPTION

In order to make the purpose, technical solutions and advantages of the present application more clearly understood, the present application will be described in further detail below with reference to the accompanying drawings and embodiments. It should be understood that the specific embodiments described herein are only used to explain the present application, but not to limit the present application.

Figure 1:
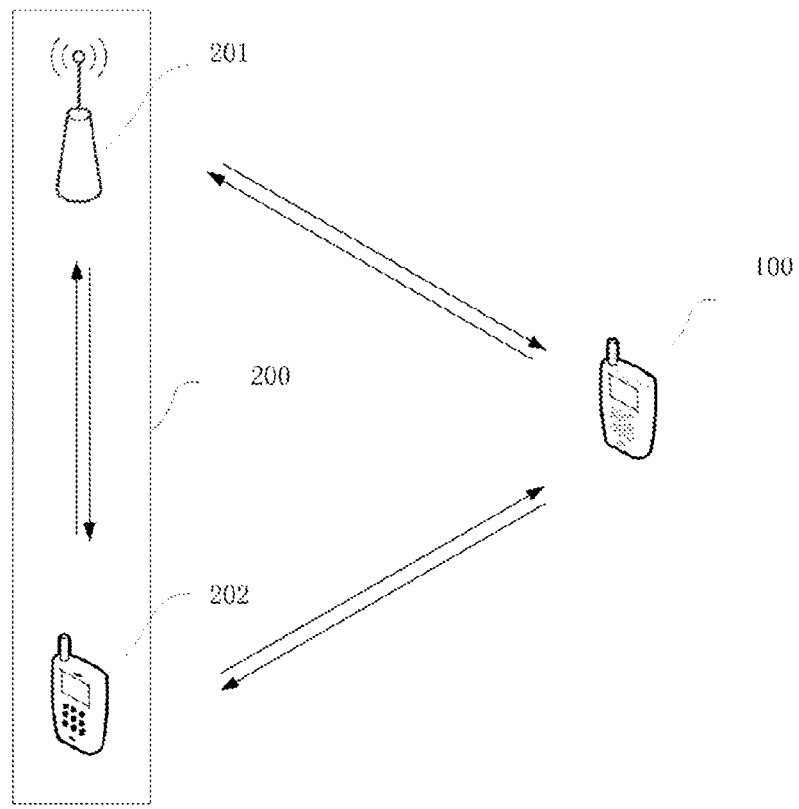
FIG. 1 is a schematic diagram of an application scenario of an information transmission method provided by an embodiment of the present application.

FIG. 1 is a schematic diagram of an application scenario of an information transmission method provided by an embodiment of the present application. As shown in FIG. 1, the scenario includes a first device 100 and a second device 200. Data transmission is performed between the first device 100 and the second device 200 through a network.

The first device 100 may be a wireless terminal, and the wireless terminal may be a device that provides voice and/or other service data connectivity to a user, a handheld device with a wireless connection function, or other processing device connected to a wireless modem. The wireless terminal may communicate with one or more core networks via a Radio Access Network (RAN), and the wireless terminal may be a mobile terminal, such as a mobile phone (or called "cellular" phone) and a computer with a mobile terminal. For example, it may be a portable, pocket-sized, hand-held, computer-built-in or vehicle-mounted mobile device that exchanges language and/or data with the wireless access network, such as a Personal Communication Service (PCS) phone, a cordless phone, a Session Initiation Protocol (SIP) phone, a Wireless Local Loop (WLL) station, a Personal Digital Assistants (PDA) and other devices. The wireless terminal may also be referred to as a system, a Subscriber Unit, a Subscriber Station, a Mobile Station, a Mobile, a Remote Station, a Remote Terminal, an Access Terminal, a User Terminal, a User Agent, a User Device or User Equipment, which are not limited here.

The second device 200 may be a network device 201 or a terminal device 202. The network device 201 may be a base station (Base Transceiver Station, BTS for short) in Global System of Mobile communication (GSM for short) or Code Division Multiple Access (CDMA for short), or a base station (NodeB, NB for short) in Wideband Code Division Multiple Access (WCDMA for short), an evolved base station (Evolutional Node B, eNB or eNodeB for short) in LTE, or a relay station or access point, or a base station in the 5G network, etc., which are not limited here. The terminal device 202 may also be a wireless terminal, which may be a device that provides voice and/or other service data connectivity to a user, a handheld device with wireless connectivity, or other processing device connected to a wireless modem. The wireless terminal may communicate with one or more core networks via a Radio Access Network (RAN), and the wireless terminal may be a mobile terminal, such as a mobile phone (or called "cellular" phone) and a computer with a mobile terminal. For example, it may be a portable, pocket-sized, hand-held, computer-built-in or vehicle-mounted mobile device that exchanges language and/or data with the wireless access network, such as a Personal Communication Service (PCS) phone, a cordless phone, a Session Initiation Protocol (SIP) phone, a Wireless Local Loop (WLL) station, a Personal Digital Assistant (PDA) and other devices. The wireless terminal may also be referred to as a system, a Subscriber Unit, a Subscriber Station, a Mobile Station, a Mobile, a Remote Station, a Remote Terminal, an Access Terminal, a User Terminal, a User Agent, a User Device or User Equipment, which are not limited here.

Before introducing the specific embodiments of the present application, the technical terms involved in the present application are explained:

transient period (Tp for short): the longest duration required to meet when the power is turned on or off;

sidelink (SL for short): a link for Device-to-Device (D2D for short) communication;

air interface: a virtual interface for wireless transmission between an access network device and a terminal device.

At present, in the conventional technology, the second device demodulates the communication signal based on the transient period and switching time specified in the protocol, so as to reduce the bit error rate of signal demodulation caused by power change or resource block hopping. However, since the transient period capabilities of the first devices are not the same, the traditional method is not flexible enough to demodulate the signal according to the fixed duration specified in the protocol.

Based on the above-mentioned traditional technology, an embodiment of the present application provides an information transmission method. By acquiring scenario information indicating a communication scenario corresponding to a first device, and sending to a second device the capability indication information indicating the transient period capability supported by the first device according to the above scenario information, the second device demodulates or determines whether to demodulate the signal sent by the first device based on the actual transient period of the first device, and the actual transient period is usually closely related to the capability of the first device per se, instead of a fixed duration specified in the protocol. Therefore, when the second device demodulates the signal sent by the first device, it is flexible to perform demodulation according to the transient period capability of each different first device, which improves the flexibility of signal demodulation.

The technical solutions of the present application and how the technical solutions of the present application solve the above-mentioned technical problems will be described in detail below with specific embodiments. The following specific embodiments may be combined with each other, and the same or similar concepts or processes may not be repeated in some embodiments. The embodiments of the present application will be described below with reference to the accompanying drawings.

Figure 2:
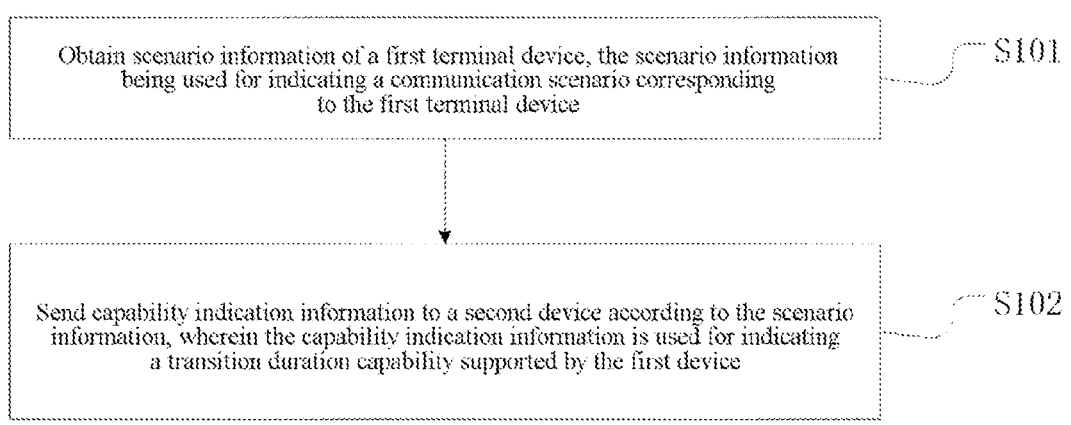
FIG. 2 is a flowchart of an information transmission method provided by an embodiment.

FIG. 2 is a flowchart of an information transmission method provided by an embodiment. The execution body of the method may be the first device 100 in the scenario shown in FIG. 1, and the present embodiment relates to a specific implementation process of how to send capability indication information to the second device. As shown in FIG. 2, the method includes the following steps.

In S101, scenario information of a first device is acquired; where the scenario information is used for indicating a communication scenario corresponding to the first device.

The scenario information is used for indicating the corresponding communication scenario of the first device, which may represent the communication scenario where the first device is currently located. For example, the scenario information may indicate that the current communication scenario where the first device is located is the air interface of the new radio (NR), or may be the communication scenario of the sidelink connection (SL) of the Long Term Evolution (LTE) system.

Optionally, the communication scenario corresponding to the first device may also indicate the communication scenario before the scenario switching and the communication scenario after the scenario switching involved in the scenario switching by the first device. For example, the communication scenario corresponding to the first device may indicate that the communication scenario of the first device before scenario switching is NR Uu, and the communication scenario after scenario switching is LTE SL. That is to say, the scenario information may indicate one communication scenario, or may indicate two communication scenarios, which is not limited in the embodiment of the present application. When acquiring the scenario information of the first device, the above-mentioned scenario information may be determined according to the type of signals transmitted by the first device, or the above-mentioned scenario information may be determined according to the communication standard or type of data interaction with the first device, or the above-mentioned scenario information may be determined according to the type of the signal transmitted by the first device and the communication standard or type of data interaction performed by the first device, which is not limited in the embodiment of the present application.

In S102, capability indication information is sent to a second device according to the scenario information, where the capability indication information is used for indicating a transient period capability supported by the first device.

The capability indication information may be used for indicating to the second device the transient period capability supported by the first terminal, where the transient period capability may be a duration required by the first device in the process of turning on or off the signal power, and the turning on or off the signal power may include a process of the power from ON to OFF, and may also include a process of the power from OFF to ON. When turning off or turning on the power switch, it usually takes a period of time to make the power reach a preset power value. During the process of each terminal device turning on or turning off the signal power, the time required for the power to reach the preset power value is the transient period capability supported by the terminal device.

Optionally, the capability indication information is further used for instructing the second device to demodulate the signal sent by the first device; or, the capability indication information is further used for instructing the second device to determine whether to demodulate the signal sent by the first device.

When sending the above-mentioned capability indication information to the second device, it may be determined according to the scenario information whether the second device to which the first device sends the capability indication information is a network device or a terminal device, and then a corresponding transmission manner is selected. For example, when the second device is a network device, it may select to send the capability indication information to the second device by carrying the capability indication information in the high layer signaling reported to the network device; and when the second device is a terminal device, it may select to send the capability indication information to the second device by broadcasting or multicasting the system message carrying the capability indication information. The embodiments of the present application do not limit the specific process of how to send the capability indication information to the second device, as long as the capability indication information is sent to the second device based on the scenario information.

In the above information transmission method, by acquiring the scenario information indicating the communication scenario corresponding to the first device, and sending the capability indication information indicating the transient period capability supported by the first device to the second device according to the above scenario information, the second device demodulates or determines whether to demodulate the signal sent by the first device according to the actual transient period of the first device, and the actual transient period is usually a duration closely related to the first device itself, not a fixed duration specified in the protocol. Therefore, when demodulating the signal sent by the first device, the second device can flexibly perform demodulation according to the transient period capability of each different first device, which improves the flexibility of signal demodulation.

Optionally, the communication scenario corresponding to the first device includes any one of the following: a communication scenario including only an air interface, a communication scenario including only a sidelink (SL), and a communication scenario including the air interface and the SL.

The communication scenario that only includes Uu may be a communication scenario in which the first device performs data interaction with the same network device, where the first device may switch between different signals, or switch between different channels, or the communication scenario that only includes Uu may be a communication scenario in which the first device performs data interaction with a dual connectivity base station, where the first device may switch from being connected to the primary base station to being connected to the secondary base station. The above-mentioned dual connectivity base station may be any one of an E-UTRA and NR dual connectivity (E-UTRA-NR Dual Connectivity, EN-DC), Multi-RAT Dual Connectivity (MR-DC), NR and E-UTRA dual connectivity (NR-E-UTRA Dual Connectivity, NE-DC), and Next Generation E-UTRA and NR Dual Connectivity (NG-RAN E-UTRA-NR Dual Connectivity, NGEN-DC). When the communication scenario corresponding to the first device is a communication scenario including only the air interface, optionally, the communication scenario corresponding to the first device includes a first communication scenario and a second communication scenario corresponding to the first terminal when switching the communication scenario.

The first communication scenario is a communication scenario in the new radio (NR) system in which the air interface transmits a first signal, and the second communication scenario is a communication scenario in the NR system in which the air interface transmits a second signal.

Alternatively, the first communication scenario is a communication scenario in the NR system in which signals are transmitted through the first channel on the air interface, and the second communication scenario is a communication scenario in the NR system in which signals are transmitted through the second channel on the air interface.

Alternatively, the first communication scenario is a communication scenario in the NR system in which transmission is performed through the air interface, and the second communication scenario is a communication scenario in the long term evolution (LTE) system in which transmission is performed through the air interface.

Alternatively, the first communication scenario is a communication scenario in the LTE system in which transmission is performed through the air interface, and the second communication scenario is a communication scenario in the NR system in which transmission is performed through the air interface.

The above-mentioned communication scenario including only the sidelink (SL) may be a communication scenario in which the first device and the terminal device directly perform data exchange, where the first device may perform switching between different signals, and may also perform switching between different channels. When the communication scenario corresponding to the first device is the communication scenario including only the SL, optionally, the communication scenario corresponding to the first device includes a first communication scenario and a second communication scenario corresponding to the first terminal when the communication scenario is switched.

The first communication scenario is a communication scenario in the new radio (NR) system in which the sidelink (SL) transmits the first signal, and the second communication scenario is a communication scenario in the NR system in which the sidelink (SL) transmits the second signal.

Alternatively, the first communication scenario is a communication scenario in the NR system in which signals are transmitted through the first channel on the SL, and the second communication scenario is a communication scenario in the NR system in which signals are transmitted through the second channel on the SL.

The above communication scenario including the air interface and the SL may include that the first device is connected to the network device through the air interface, and at the same time, the first device is connected to the terminal device through the SL. Then the communication scenario switching under the communication scenario including the air interface and the SL may be switching the first device to the communication scenario in which the first device is connected to the terminal device through the SL when the first device is connected to the network device through the air interface, or switching the first device to connect to the network device through the air interface when the first device is connected to the terminal device through the SL. When the communication scenario corresponding to the first device is a communication scenario including the air interface and the SL, optionally, the communication scenario corresponding to the first device includes the first communication scenario and the second communication scenario corresponding to the first terminal when the communication scenario is switched.

The first communication scenario is a communication scenario in the new radio (NR) system in which transmission is performed through SL, and the second communication scenario is a communication scenario in the NR system in which transmission is performed through the air interface.

Alternatively, the first communication scenario is a communication scenario in the NR system in which transmission is performed through the air interface, and the second communication scenario is a communication scenario in the NR system in which transmission is performed through the SL.

Alternatively, the first communication scenario is a communication scenario in the NR system in which transmission is performed through the air interface, and the second communication scenario is a communication scenario in the long term evolution (LTE) system in which transmission is performed through the SL.

Alternatively, the first communication scenario is a communication scenario in the LTE system in which transmission is performed through the SL, and the second communication scenario is a communication scenario in the NR system in which transmission is performed through the air interface.

Alternatively, the first communication scenario is a communication scenario in the NR system in which transmission is performed through SL, and the second communication scenario is a communication scenario in the LTE system in which transmission is performed through the air interface.

Alternatively, the first communication scenario is a communication scenario in the LTE system in which transmission is performed through the air interface, and the second communication scenario is a communication scenario in the NR system in which transmission is performed through the SL.

Alternatively, the first communication scenario is a communication scenario in the NR system in which transmission is performed through SL, and the second communication scenario is a communication scenario in the LTE system in which transmission is performed through SL.

Alternatively, the first communication scenario is a communication scenario in the LTE system in which transmission is performed through SL, and the second communication scenario is a communication scenario in the NR system in which transmission is performed through SL.

In the above information transmission method, the communication scenario corresponding to the first device includes any one of the following: a communication scenario including only the air interface, a communication scenario including only the sidelink (SL), and a communication scenario including the air interface and the SL, so that when sending the capability indication information to the second device according to the scenario information, the types of scenario information are rich, so that sending the capability indication information to the second device according to the scenario information can adapt to various complex communication scenarios, thereby enriching the scenarios to which the information transmission method is adapted.

In an embodiment, if the communication scenario corresponding to the first device indicated by the scenario information is a communication scenario including only an air interface, the above S102 includes: sending a first radio resource control (RRC) signaling to the network device, where the first RRC signaling carries the capability indication information.

If the scenario information indicates that the communication scenario corresponding to the first device is a communication scenario including only an air interface, at this time, the first device is connected to the network device, and the first device may switch between different signals or different channels. During switching, the first device may send the capability indication information to the second device by sending first Radio Resource Control (RRC) signaling to the network device. The above-mentioned capability indication information is carried in the first RRC signaling. Optionally, the first RRC signaling includes a terminal equipment capability information element, and the capability indication information is carried in the terminal equipment capability information element. The terminal device capability information elements (UE capability information elements) included in the first RRC signaling may be as follows:

```
UE capability information elements
TransientPeriodNR ::= SEQUENCE {
  Tp-Uu ENUMERATED {n0us, n5us, n10us, n15us, n20us, ...}
  OPTIONAL,
  }
``` where Tp-Uu is the above-mentioned capability indication information.

In the above information transmission method, if the communication scenario corresponding to the first device indicated by the scenario information is a communication scenario including only the air interface, sending the capability indication information to the second device may be sending a first Radio Resource Control (RRC) carrying the capability indication information to the network device, so that the network device can demodulate the signal sent by the first device through the transient period capability of the first device indicated in the capability indication information, that is, the network device demodulates the signal sent by the first device according to the actual transient period of the first device, and the actual transient period is usually closely related to the first device itself, not the fixed duration specified by the protocol. In this way, when demodulating the signals sent by the first device, the network device flexibly demodulates the signals according to the transient period capability of each different first device, which improves the flexibility of signal demodulation. At the same time, the first RRC signaling is existing signaling. When sending the capability indication information to the second device, the existing signaling is used for sending, thereby avoiding waste of signaling resources and improving signaling compatibility.

In an embodiment, if the communication scenario corresponding to the first device indicated by the scenario information is a communication scenario including only SL, the above S102 "sending the capability indication information to the second device according to the scenario information" includes: sending to the second device a system message, which carries the capability indication information.

If the communication scenario corresponding to the first device indicated by the scenario information is a communication scenario including only SL, in this scenario, the first device may perform switching between different signals or different channels. During handover, the first device may send a system message carrying the capability indication information to the second device, so as to realize sending the capability indication information to the second device. Optionally, the above system message may be sent in the form of broadcast or multicast. The above-mentioned system message may be sent to the second device through a system information block (SIB), or may be sent to the second device through a control information block (master information block, MIB), which is not limited in the embodiments of the present application. Among them, the MIB usually includes a limited number of transmission parameters, and other information usually needs to be obtained from the cell.

In the above scenario including SL, the first device and the second device are sidelink connections. As an optional implementation manner of the above-mentioned sending of the system message, the first device may forward the system message to the second device through the network device. Specifically, the first device may send the system message to the network device through a target channel, and the network device is configured to forward the system message to the second device after receiving the system message. The target channel may include a Physical Broadcast Channel (PBCH) or a Physical Downlink Shared Channel (PDSCH). The above MIB may be transmitted on the PBCH.

As an optional implementation manner of sending the system message above, the first device may directly send the system message to the second device. Specifically, the system message may be sent to the second device through a target channel, where the target channel includes a Physical Sidelink Broadcast Channel (PSBCH) or a Physical Sidelink Shared Channel (PSSCH), and the above SIB is transmitted on the PDSCH.

In the above information transmission method, if the communication scenario corresponding to the first device indicated by the scenario information is a communication scenario including only the SL, sending the capability indication information to the second device may be sending a system message carrying the capability indication information to the second device, so that the second device can demodulate the signal sent by the first device through the transient period capability of the first device indicated in the capability indication information, that is to say, when the second device demodulates the signal sent by the first device, the demodulation or determination of whether to demodulate is performed according to the actual transient period of the first device, and the actual transient period is usually closely related to the first device itself, not the fixed duration specified in the protocol. Therefore, when demodulating the signal sent by the first device, the second device performs the demodulation flexibly according to the transient period capability of each different first device, which improves the flexibility of signal demodulation. At the same time, when sending the capability indication information to the second device, the existing channel can be used to send the system message, thereby avoiding waste of channel resources.

In an embodiment, if the communication scenario corresponding to the first device indicated by the scenario information is a communication scenario including only SL, the above S102 "sending the capability indication information to the second device according to the scenario information" includes: sending the capability indication information based on a target sending form, where the target sending form is determined based on a current location of the first device.

The target sending form may be to directly send the capability indication information to the second device, or may be to forward the capability indication information to the second device through the network device, which is not limited in the embodiments of the present application. When the target sending form is to send directly to the second device, the capability indication information may be directly carried in the system message and sent to the second device. When the target sending form is forwarding through the network device, the capability indication information may be carried in the signaling reported to the network device and sent to the network device, and the network device is configured to forward the capability indication information carried in the signaling to the second device.

Specifically, the first device may select a target sending form matching the current location of the first device according to a corresponding relationship between the current location of the first device and the sending form, and send the capability indication information. The current location of the first device may be determined according to a distance between the first device and the second device, or may be determined according to a distance between the first device and the network device, which is not limited by the embodiments of the present application. For example, when the distance between the first device and the second device is less than the longest communication distance between the first device and the second device, the determined sending form may be to directly send the system message carrying the capability indication information to the second device.

Optionally, if the current location of the first device is within the coverage of the network device, the target sending form includes sending capability indication information to the second device through the network device. Optionally, the system message is sent to the network device, and the network device is used for forwarding the system message to the second device, and the system message carries the capability indication information; or, a second RRC signaling is sent to the network device, and the network device is used for forwarding the second RRC signaling to the second device, where the second RRC signaling carries the capability indication information.

In the above information transmission method, if the communication scenario corresponding to the first device indicated by the scenario information is a communication scenario including only the SL, the first device may send the capability indication information in the target sending form determined based on the current location of the first device, that is to say, the first device can flexibly select the target sending form for sending the capability indication information to the second device based on its current location, which improves the flexibility of sending the capability indication information to the second device.

In an embodiment, if the communication scenario corresponding to the first device indicated by the scenario information is a communication scenario including the air interface and the SL, and the second device includes the first network device and the terminal device, then the above S102 "according to the scenario information, sending the capability indication information to the second device" includes: sending a third RRC signaling to the first network device, and sending a fourth RRC signaling or system message to the terminal device; where the third RRC signaling carries a transient period capability of the first device under the air interface, and the fourth RRC signaling or system message carries a transient period capability of the first device under the SL.

The communication scenario corresponding to the first device indicated by the scenario information in this embodiment is a communication scenario including an air interface and an SL. In this scenario, the second device includes a first network device and a terminal device, and the first device may be connected to the first network device, and may also be connected with the terminal device. When the first device is connected to the terminal device, the connection between the first device and the terminal device may be switched to the connection between the first device and the first network device, for example, the communication scenario of transmission through SL is switched to the communication scenario of transmission through Uu. When the first device is connected to the first network device, the connection between the first device and the first network device may be switched to the connection between the first device and the terminal device, for example, the communication scenario of transmission through Uu is switched to the communication scenario of transmission through SL.

During handover, the first device needs to send capability indication information to the terminal device and the first network device at the same time, so as to send the capability indication information to the second device. The above-mentioned capability indication information may include the transient period capability of the first device under Uu and the transient period capability of the first device under SL. Optionally, the first device may send the capability indication information indicating the transient period capability of the first device under the air interface to the first network device, where the capability indication information may be carried in third RRC signaling and sent to the network device. The first device may send the capability indication information indicating the transient period capability of the first device under the SL to the terminal device, where the capability indication information may be carried in the fourth RRC signaling, or carried in a system message, and sent to the terminal device. It should be noted that when the capability indication information is carried in the system message and sent to the terminal device, it may be directly sent to the terminal device, or may be forwarded to the terminal device through a second network device. When the capability indication information is carried in the fourth RRC signaling, it may be forwarded to the terminal device through the second network device. Optionally, the fourth RRC signaling is sent to the second network device, and the second network device is used for forwarding the fourth RRC signaling to the second device; or, the system message is sent to the second network device, and the system message is forwarded to the terminal device through the second network device.

In the above information transmission method, if the communication scenario corresponding to the first device indicated by the scenario information is a communication scenario including an air interface and an SL, and the second device includes the first network device and the terminal device, when sending the capability indication information to the second device, it is possible to send a third RRC signaling carrying the transient period capability of the first device under the air interface to the first network device, and send a fourth RRC signaling or system message carrying the transient period capability of the first device under the SL to the terminal device, so that the first network device can demodulate or determine whether to demodulate the signal sent by the first device according to the capability indication information that indicates the transient period capability of the first device under the air interface carried in the third RRC signaling, and the terminal device can demodulate or determine whether to demodulate the signal sent by the first device according to the capability indication information that indicates the transient period capability of the first device under the SL carried in the fourth RRC signaling or the system message. That is, when the first network device and the terminal device demodulate or determine whether to demodulate the signal sent by the first device, the demodulations are performed based on the transient period capability of the first device under Uu, or the transient period capability of the first device under SL, respectively, which further improves the accuracy of demodulating the signal sent by the first device according to the transient period capability. At the same time, when the capability indication information is sent to the second device, the existing RRC signaling can be used for sending, which avoids waste of signaling resources and improves the utilization rate of signaling resources.

In an embodiment, optionally, the transient period capability of the first device under the air interface is the same as the transient period capability under the SL. Based on this, when the first device sends the first RRC signaling to the network device, the first RRC signaling carries capability indication information indicating the transient period capability of the first device under the air interface, and when sending the second RRC signaling to the second device, the second RRC signaling carries the capability indication information indicating the transient period capability of the first device under SL, and the first RRC signaling and the second RRC signaling may be the same signaling, that is, the first RRC signaling may multiplex the second RRC signaling. Optionally, the third RRC signaling sent by the first device to the first network device and the fourth RRC signaling sent by the first device to the terminal device may be the same signaling.

In the above information transmission method, the transient period capability of the first device under the air interface is the same as the transient period capability under the SL, so that the first RRC signaling sent by the first device to the network device and the second RRC signaling sent by the first device to the second device may be the same signaling, which avoids the need to send different RRC signalings to the network device and the second device when the communication scenario indicated by the scenario information is a communication scenario including an air interface and an SL, and the convenience of sending the capability indication information to the second device is improved. At the same time, when the capability indication information is sent to the second device, the existing RRC signaling can be used for sending, which avoids waste of signaling resources and improves the utilization rate of signaling resources.

Optionally, the target resource corresponding to the above-mentioned transient period capability includes: a first time domain resource of the first communication scenario and/or a second time domain resource of the second communication scenario.

It can be seen from the above description that the transient period capability may be the duration required by the first device in the process of turning on or off the signal power, and usually needs to occupy the time domain resource. The time domain resource occupied by the first device when turning on or off the signal power is the target resource corresponding to the above-mentioned transient period capability. Optionally, the target resource corresponding to the transient period capability may include: a first time domain resource of the first communication scenario and a second time domain resource of the second communication scenario. It may be part of the resources in the first time domain resource and part of the resources in the second time domain resource. For example, the target resource may be the last symbol of the first time domain resource and the first symbol of the second time domain resource. Optionally, the target resource corresponding to the transient period capability includes: the first time domain resource of the first communication scenario or the second time domain resource of the second communication scenario. It may be part of the resources in the first time domain resource or part of the resources in the second time domain resource. For example, the target resource may be a part of the last symbol of the first time domain resource or a part of the first symbol of the second time domain resource.

Optionally, the target resource corresponding to the transient period capability includes: a blank symbol or a guard interval symbol in the first time domain resource of the first communication scenario.

The target resource corresponding to the transient period capability may be all the blank symbols in the first time domain resource, or may be part of the blank symbols in the first time domain resource, which is not limited in the embodiments of the present application. The target resource corresponding to the transient period capability may also include: a guard interval symbol in the first time domain resource of the first communication scenario. It may be all of the guard interval symbols in the first time domain resource, or may be part of the guard interval symbols in the first time domain resource, which is not limited in the embodiments of the present application.

In an embodiment, the transient period capability includes the transient period capability of the first device when the power is turned off, and/or the transient period capability of the first device when the power is turned on.

Optionally, the first target resource corresponding to the transient period capability when the power is turned off includes: a third time domain resource of the first communication scenario, and the second target resource corresponding to the transient period capability when the power is turned on includes: a fourth time domain resource of the second communication scenario. The first target resource may be one symbol in the third time domain resource, may also be a part of one symbol in the third time domain resource, or may be multiple symbols in the third time domain resource, which is not limited by the embodiments of the present application. The second target resource may be one symbol in the fourth time domain resource, may also be a part of one symbol in the fourth time domain resource, or may be multiple symbols in the fourth time domain resource, which is not limited by the embodiments of the present application.

In another embodiment, the capability indication information may also be used for indicating the corresponding switching period capability when the first device switches the time domain resources. In some cases, such as in the scenario of communication scenario switching, when the first device switches from the first communication scenario to the second communication scenario, in addition to the operation of turning on or off the power, it is also necessary to perform the operation of switching the time domain resources. When switching the time domain resources, it usually involves changes in physical resources, that is to say, it takes a period of time to switch the first device from the time domain resources of the first communication scenario to the time domain resources of the second communication scenario, and this period of time is the switching period.

Based on this, when the capability indication information is sent to the second device, the corresponding switching period capability of the first device when switching the time domain resource may be sent to the second device at the same time. For example, if the communication scenario indicated by the scenario information is a communication scenario including an air interface and an SL, the first RRC signaling is sent to the network device, and the second RRC signaling or system message is sent to the second device; where the first RRC signaling carries the transient period capability and the switching period capability of the first device under the air interface, and the second RRC signaling or system message carries the transient period capability and the switching period capability of the first device under the SL.

In the above information transmission method, the capability indication information sent to the second device is also used for indicating the corresponding switching period capability of the first device when switching the time domain resource, so that when the second device demodulates or determines whether to demodulate the signal sent by the first device according to the capability indication information, it is performed based on both the transient period capability and the switching period capability of the first device, which further improves the accuracy of demodulating or determining whether to demodulate the signal sent by the first device according to the capability indication information.

Optionally, the third target resource corresponding to the switching period capability includes: the third time domain resource of the first communication scenario, or the fourth time domain resource of the second communication scenario, or the third time domain resource of the first communication scenario and the fourth time domain resource of the second communication scenario. The third target resource may be one symbol in the third time domain resource, may also be a part of one symbol in the third time domain resource, or may be multiple symbols in the third time domain resource, which is not limited by the embodiments of the present application. The third target resource may be one symbol in the fourth time domain resource, may also be a part of one symbol in the fourth time domain resource, or may be multiple symbols in the fourth time domain resource, which is not limited by the embodiments of the present application. The third target resource may also be the last symbol in the third time domain resource and a symbol of the fourth time domain resource adjacent to the third time domain resource, and the adjacent symbol may be the first symbol of the fourth time domain resource, or may be multiple symbols, and may also be a part of the first symbol, which is not limited in the embodiments of the present application. The third target resource may also be the first symbol of the fourth time domain resource and a symbol adjacent to the above first symbol in the third time domain resource, and the adjacent symbol may be the last symbol of the third time domain resource, may also be multiple symbols including the last symbol in the third time domain resource, or may be part of the last symbol, which is not limited in the embodiments of the present application.

Optionally, the first target resource corresponding to the transient period capability when the power is turned off includes: an interval symbol for transition protection in the third time domain resource of the first communication scenario, and the second target resource corresponding to the transient period capability when the power is turned on includes: the fourth time domain resource of the second communication scenario. If the first target resource corresponding to the transient period capability when the power is turned off includes: the interval symbol for transition protection in the third time domain resource of the first communication scenario, and the second target resource corresponding to the transient period capability when the power is turned on includes: the fourth time domain resource of the second communication scenario, then the third target resource corresponding to the switching period capability includes: the interval symbol for transition protection in the third time domain resource of the first communication scenario, or, the fourth time domain resource of the second communication scenario, or the interval symbol for transition protection in the third time domain resource of the first communication scenario and the fourth time domain resource of the second communication scenario.

Optionally, the first target resource corresponding to the transient period capability when the power is turned off includes: the third time domain resource of the first communication scenario, and the second target resource corresponding to the transient period capability when the power is turned on includes: the third time domain resource of the first communication scenario and the fourth time domain resource of the second communication scenario. If the first target resource corresponding to the transient period capability when the power is turned off includes: the third time domain resource of the first communication scenario, and the second target resource corresponding to the transient period capability when the power is turned on includes: the third time domain resource of the first communication scenario and the fourth time domain resource of the second communication scenario, the third target resource corresponding to the switching period capability includes: the third time domain resource of the first communication scenario.

Optionally, the first target resource corresponding to the transient period capability when the power is turned off includes: the third time domain resource of the first communication scenario and the fourth time domain resource of the second communication scenario, and the second target resource corresponding to the transient period capability when the power is turned on includes: the fourth time domain resource of the second communication scenario. If the first target resource corresponding to the transient period capability when the power is turned off includes: the third time domain resource of the first communication scenario and the fourth time domain resource of the second communication scenario, and the second target resource corresponding to the transient period capability when the power is turned on includes: the fourth time domain resource of the second communication scenario, then the third target resource corresponding to the switching period capability includes: the fourth time domain resource of the second communication scenario.

Optionally, the first target resource corresponding to the transient period capability when the power is turned off includes: the third time domain resource of the first communication scenario, and the second target resource corresponding to the transient period capability when the power is turned on includes: the third time domain resource of the first communication scenario and the fourth time domain resource of the second communication scenario. If the first target resource corresponding to the transient period capability when the power is turned off includes: the third time domain resource of the first communication scenario, and the second target resource corresponding to the transient period capability when the power is turned on includes: the third time domain resource of the first communication scenario resource and the fourth time domain resource of the second communication scenario, the third target resource corresponding to the switching period capability includes: the third time domain resource of the first communication scenario.

Optionally, the first target resource corresponding to the transient period capability when the power is turned off includes: an interval symbol for transition protection in the third time domain resource of the first communication scenario, and the second target resource corresponding to the transient period capability when the power is turned on includes: the interval symbol for transition protection in the third time domain resource of the first communication scenario and the fourth time domain resource of the second communication scenario. If the first target resource corresponding to the transient period capability when the power is turned off includes: the interval symbol for transition protection in the third time domain resource of the first communication scenario, and the second target resource corresponding to the transient period capability when the power is turned on includes: the interval symbol for transition protection in the third time domain resource of the first communication scenario, and the fourth time domain resource of the second communication scenario, then the third target resource corresponding to the handover duration capability includes: the interval symbol for transitional protection in the third time domain resource of the first communication scenario.

Figure 3:
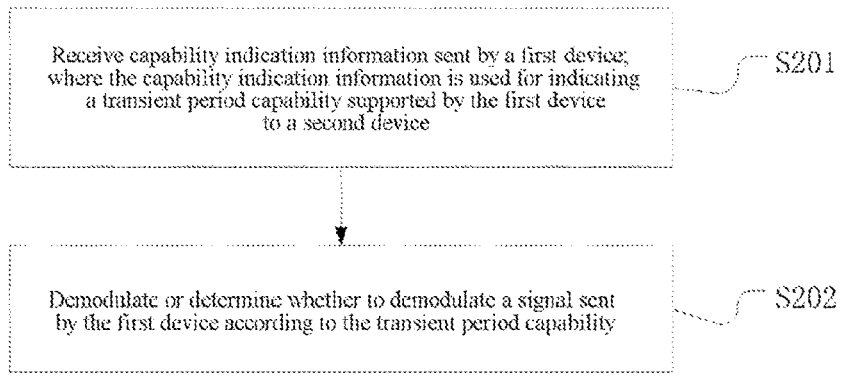
FIG. 3 is a flowchart of an information transmission method provided by an embodiment.

FIG. 3 is a schematic flowchart of an information transmission method in an embodiment. The execution body of this embodiment is the second device 200 shown in FIG. 1, and this embodiment involves the specific process of demodulating or determining whether to demodulate the signal sent by the first terminal by the second device according to the transient period capability after receiving the capability indication information sent by the first device. As shown in FIG. 3, the method includes the following steps.

In S201, capability indication information sent by a first device is received; where the capability indication information is used for indicating a transient period capability supported by the first device to a second device.

When the second device receives the capability indication information that indicates the transient period capability supported by the first device and is sent by the first device, it may receive the capability indication information by receiving the signaling carrying the capability indication information reported by the first device, or it may receive the capability indication information by receiving the signaling carrying the capability indication information broadcast or multicast by the first device, or it may receive the capability indication information by receiving the system message that carries the capability indication information broadcast or multicast by the first device, which is not limited by the embodiments of the present application.

In S202, a signal sent by the first device is demodulated or determined whether to demodulate according to the transient period capability.

After receiving the capability indication information sent by the first device, the second device may demodulate or determine whether to demodulate the signal sent by the first device. Demodulating the signal sent by the first device according to the transient period capability may mean that the second device may determine the target resource corresponding to the transient period capability according to the transient period capability, and then determine how to demodulate the signal on the target resource when the second device performs demodulation on the signal sent by the first terminal according to a preset demodulation method, which may be to demodulate the signal on the target resource or not to demodulate the signal on the target resource. Determining whether to demodulate the signal sent by the first device according to the transient period capability may refer to the process of first determining the target resource corresponding to the transient period capability according to the transient period capability, and then determining the demodulation state of the target resource. The above demodulation state may be used for indicating that the target resource is demodulated, or the target resource is not demodulated. That is to say, determining whether to demodulate only determines the demodulation state of the target resource. Only when the second device needs to demodulate the signal sent by the first device, it determines whether to demodulate the target resource according to the demodulation state of the target resource.

In a possible case, the second device may determine whether the target resource can be used for signal transmission according to the length of the target resource occupied by the transient period capability and the total length of the target resource, and when the target resource can also be used for signal transmission, when demodulating the signal sent by the first device, the target resource needs to be demodulated.

In the above information transmission method, the second device receives the capability indication information sent by the first device that indicates the transient period capability supported by the first device, and demodulates or determines whether to demodulate the signal sent by the first device according to the transient period capability, so that when the second device demodulates or determines whether to demodulate the signal sent by the first device, it is based on the actual transient period of the first device, and the actual transient period is usually a duration closely related to the first device itself, but not a fixed duration specified in the protocol. Therefore, when the second device demodulates the signal sent by the first device, it can flexibly perform demodulation or demodulation judgment according to the transient period capability of each different first device, which improves the flexibility of signal demodulation. At the same time, the second device may determine whether the target resource can be used for signal transmission according to the length of the target resource occupied by the actual transient period capability of the first device and the total length of the target resource, so as to avoid directly using the target resource corresponding to the transient period capability for only the transition of ON and Off of the power, thereby improving the utilization rate of resources.

Optionally, a possible implementation method of the above-mentioned S202 "demodulating the signal sent by the first device according to the transient period capability" includes: determining a second target resource to be demodulated by the second device according to the first target resource corresponding to the transient period capability, and demodulating the signal on the second target resource. The first target resource corresponding to the transient period capability may be the time domain resource occupied by the first device in the process of turning on or off the signal power. When the second device determines the first target resource corresponding to the transient period capability according to the transient period capability, other resources than the first target resource among the resources corresponding to the signal sent by the first device may be used as the second target resource to be demodulated by the second device, or other resources than the first target resource and part of the first target resource may be determined as the second target resource to be demodulated, which is not limited in the embodiments of the present application. Optionally, a part of the first target resource overlaps a part of the second target resource. When the second target resource includes part of the first target resource, the above-mentioned part of the first target resource may be part of the first target resource that is not occupied by the transient period capability. For example, the first target resource corresponding to the transient period capability is the last symbol on the first time domain resource, the total length of the last symbol is 66.67 µs, and the duration of the transient period capability is 10 µs. That is to say, the first target resource is not fully occupied as a transition of power ON or OFF, and symbols of 56.67 µs other than 10 µs may be used for data transmission. At this time, part of resources in the first target resource may be used for data transmission. When part of resources in the first target resource is used for data transmission, the second target resource to be demodulated includes the part of the above-mentioned first target resource. When there is no resource for data transmission in the first target resource, the second target resource to be demodulated does not include part of the above-mentioned first target resource. Optionally, the first target resource does not overlap with the second target resource.

In the above information transmission method, the second device determines the second target resource to be demodulated by the second device according to the first target resource corresponding to the transient period capability, and demodulates the signal on the second target resource, so that when the second device demodulates the signal sent by the first device, the demodulation is performed based on the actual transient period capability of the first device, which more accurately removes the demodulation by the first device after the resources occupied by turning on or off the signal power, and improves the performance of the demodulation, thereby improving the accuracy of signal demodulation.

Optionally, a possible implementation method of the above-mentioned S202 "determining whether to demodulate the signal sent by the first device according to the transient period capability" includes: determining not receive and not demodulate, receive but not demodulate, or receive and partially demodulate the signal on the target resource corresponding to the transient period capability by the second device according to the transient period capability.

Similar to the content described in the foregoing embodiment, when the second device determines whether to demodulate the signal sent by the first terminal according to the transient period capability, it determines the demodulation state of the target resource corresponding to the transient period capability, which may be not receiving and not demodulating the signal on the target resource, or receiving but not demodulating the signal on the target resource, or receiving and partially demodulating the signal on the target resource.

In an embodiment, if the second device is a network device, S201 "receiving capability indication information sent by the first device" includes: receiving the first radio resource control (RRC) signaling sent by the first device, where the first RRC signaling carries the capability indication information.

Optionally, the first RRC signaling includes a terminal equipment capability information element, and the capability indication information is carried in the terminal equipment capability information element.

In an embodiment, S201 "receiving the capability indication information sent by the first device" includes: receiving a system message sent by the first device, where the system message carries the capability indication information.

In an embodiment, if the second device is a terminal device, then S201 "receiving the capability indication information sent by the first device" includes: receiving a system message sent by the first device through a network device. After receiving the system message sent by the first device through the network device, the network device may be used to forward the system message to the second device, it may directly forward the system message to the second device, or it may demodulate the system message and then forward the demodulated system message to the second device, which is not limited in the embodiments of the present application.

In an embodiment, if the second device is a terminal device, then S201 "receiving the capability indication information sent by the first device" includes: receiving a system message sent by the first device through a target channel, where the target channel includes a physical sidelink broadcast channel (PSBCH) or a Physical sidelink shared channel (PSSCH).

In an embodiment, if the second device is a terminal device, then S201 "receiving the capability indication information sent by the first device" includes: receiving, through the network device, the second RRC signaling sent by the first device, where the second RRC signaling carries the capability indication information.

The specific process of how the second device receives the capability indication information sent by the first device described in the foregoing embodiment is similar to the principle and technical effect of the foregoing method embodiment of "sending capability indication information to the second device", and will not be repeated here.

Figure 4:
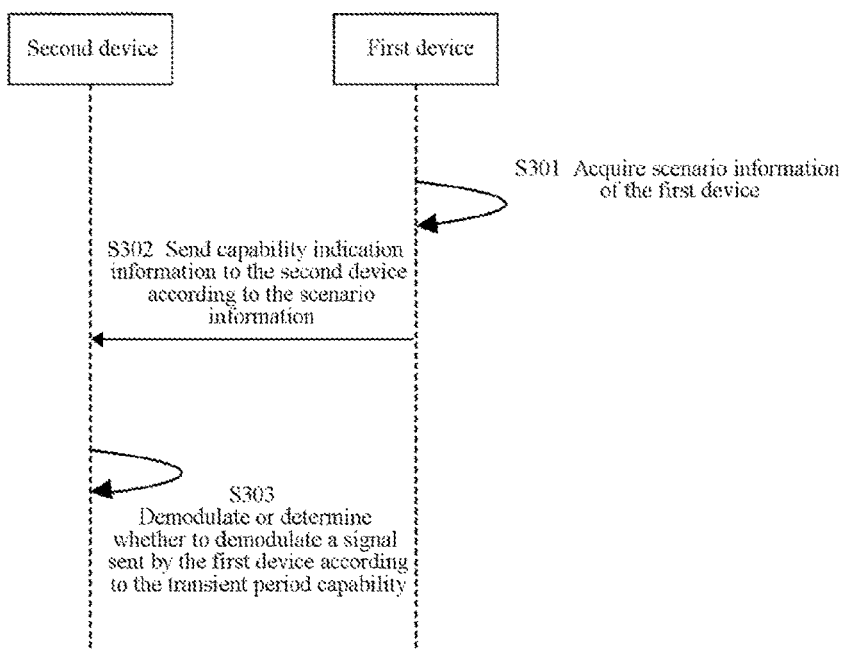
FIG. 4 is a flowchart of an information transmission method provided by an embodiment.

FIG. 4 is a schematic flowchart of an information transmission method in an embodiment. As shown in FIG. 4, the method includes the following steps.

In S301, the first device acquires scenario information of the first device. The scenario information is used for indicating a communication scenario corresponding to the first device.

In S302, the first device sends capability indication information to the second device according to the scenario information. The capability indication information is used for indicating to the second device a transient period capability supported by the first device.

In S303, the second device demodulates or determines whether to demodulate a signal sent by the first device according to the transient period capability.

The implementation principle and technical effect of the information transmission method in the above-mentioned embodiments are similar to those of the above-mentioned method embodiments, and details are not described herein again.

It should be understood that although the steps in the flowcharts of FIGS. 2-4 are shown in sequence according to the arrows, these steps are not necessarily executed in the sequence shown by the arrows. Unless explicitly stated herein, the execution of these steps is not strictly limited to the order, and these steps may be performed in other orders. Moreover, at least a part of the steps in FIGS. 2-4 may include multiple sub-steps or multiple stages. These sub-steps or stages are not necessarily executed and completed at the same time, but may be executed at different times. The order of execution of these sub-steps or stages is not necessarily sequential, but may be performed in turn or alternately with other steps or at least a part of sub-steps or stages of other steps.

Figure 5:
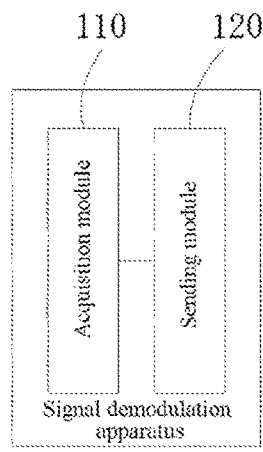
FIG. 5 is a block diagram of an information transmission apparatus provided by an embodiment.

FIG. 5 is a block diagram of an information transmission apparatus in an embodiment. As shown in FIG. 5, the information transmission apparatus includes: an acquisition module 110 and a sending module 120.

The acquisition module 110 is configured to acquire scenario information of a first device, where the scenario information is used for indicating a communication scenario corresponding to the first device.

The sending module 120 is configured to send capability indication information to a second device according to the scenario information, where the capability indication information is used for indicating a transient period capability supported by the first device.

In an embodiment, the capability indication information is further used for instructing the second device to demodulate a signal sent by the first device; or, the capability indication information is also used for instructing the second device to determine whether to demodulate the signal sent by the first device.

In an embodiment, the communication scenario corresponding to the first device includes any of the following:

a communication scenario including only an air interface, a communication scenario including only a sidelink (SL), and a communication scenario including the air interface and the SL.

In an embodiment, the sending module 120 is specifically configured to send a first radio resource control (RRC) signaling to the second device if the scenario information indicates that the communication scenario corresponding to the first device is a communication scenario including only an air interface, the first RRC signaling carrying the capability indication information.

In an embodiment, the above-mentioned first RRC signaling includes a terminal equipment capability information element, and the capability indication information is carried in the terminal equipment capability information element.

In an embodiment, the sending module 120 is specifically configured to send a system message to the second device if the scenario information indicates that the communication scenario corresponding to the first device is a communication scenario including only the SL, where the system message carries the capability indication information.

In an embodiment, the sending module 120 is specifically configured to send the system message to the second device through a network device, and the network device is configured to forward the system message to the second device after receiving the system message.

In an embodiment, the sending module 120 is specifically configured to send a system message to the second device through a target channel, where the target channel includes a physical sidelink broadcast channel (PSBCH) or a physical sidelink shared channel (PSSCH).

In an embodiment, the sending module 120 is specifically configured to, if the scenario information indicates that the communication scenario corresponding to the first device is the communication scenario including only the SL, send the capability indication information based on a target sending form, where the target sending form is determined based on a current location of the first device.

In an embodiment, if the current location of the first device is within a coverage of the network device, the target sending form includes sending the capability indication information to the second device through the network device.

In an embodiment, the sending module 120 is specifically configured to send a system message to a network device, and the network device is configured to forward the system message to the second device, where the system message carries capability indication information; or, send a second RRC signaling to the network device, the network device is configured to forward the second RRC signaling to the second device, where the second RRC signaling carries the capability indication information.

In an embodiment, the sending module 120 is specifically configured to, if the scenario information indicates that the communication scenario corresponding to the first device is a communication scenario including an air interface and an SL, and the second device includes a first network device and a terminal device, send the capability indication information to the second device, including: sending a third RRC signaling to the first network device; sending a fourth RRC signaling or system message to the terminal device; where the third RRC signaling carries a transient period capability supported by the first device under the air interface, the fourth RRC signaling or system message carries a transient period capability supported by the first device under the SL.

In an embodiment, the sending module 120 is specifically configured to send the fourth RRC signaling to the second network device, and the second network device is configured to forward the fourth RRC signaling to the terminal device; or, the sending module 120 is configured to send the system message to the second network device, and the second network device is configured to forward the system message to the terminal device.

In an embodiment, the transient period capability supported by the first device under the air interface is the same as the transient period capability supported under the SL.

In an embodiment, the communication scenario corresponding to the first device includes a first communication scenario and a second communication scenario corresponding to the first terminal when switching the communication scenario.

The first communication scenario is a communication scenario in the new radio (NR) system in which the air interface transmits the first signal, and the second communication scenario is a communication scenario in the NR system in which the air interface transmits the second signal.

Alternatively, the first communication scenario is a communication scenario in the NR system in which the signal is transmitted through the first channel on the air interface, and the second communication scenario is a communication scenario in the NR system in which the signal is transmitted through the second channel on the air interface.

Alternatively, the first communication scenario is a communication scenario in the NR system for transmission over the air interface, and the second communication scenario is a communication scenario in the long term evolution (LTE) system for transmission over the air interface.

Alternatively, the first communication scenario is a communication scenario in the LTE system for transmission over the air interface, and the second communication scenario is a communication scenario in the NR system for transmission over the air interface.

In an embodiment, the communication scenario corresponding to the first device includes a first communication scenario and a second communication scenario corresponding to the first terminal when switching the communication scenario.

The first communication scenario is a communication scenario in the new radio (NR) system in which the sidelink (SL) transmits the first signal, and the second communication scenario is a communication scenario in the NR system in which the sidelink (SL) transmits the second signal.

Alternatively, the first communication scenario is a communication scenario in the NR system in which signals are transmitted through the first channel on the SL, and the second communication scenario is a communication scenario in the NR system in which signals are transmitted through the second channel on the SL.

In an embodiment, the communication scenario corresponding to the first device includes a first communication scenario and a second communication scenario corresponding to when the first terminal switches the communication scenario.

The first communication scenario is a communication scenario in the new radio (NR) system in which the transmission is performed through SL, and the second communication scenario is a communication scenario in the NR system in which the transmission is performed through an air interface.

Alternatively, the first communication scenario is a communication scenario in the NR system in which the transmission is performed through the air interface, and the second communication scenario is a communication scenario in the NR system in which the transmission is performed through the SL.

Alternatively, the first communication scenario is a communication scenario in the NR system in which the transmission is performed through the air interface, and the second communication scenario is a communication scenario in the long term evolution (LTE) system in which the transmission is performed through the SL.

Alternatively, the first communication scenario is a communication scenario in the LTE system in which the transmission is performed through the SL, and the second communication scenario is a communication scenario in the NR system in which the transmission is performed through the air interface.

Alternatively, the first communication scenario is a communication scenario in the NR system in which the transmission is performed through SL, and the second communication scenario is a communication scenario in the LTE system in which the transmission is performed through an air interface.

Alternatively, the first communication scenario is a communication scenario in the LTE system in which the transmission is performed through the air interface, and the second communication scenario is a communication scenario in the NR system in which the transmission is performed through the SL.

Alternatively, the first communication scenario is a communication scenario in the NR system for transmission through SL, and the second communication scenario is a communication scenario in the LTE system for transmission through SL.

Alternatively, the first communication scenario is a communication scenario in the LTE system in which the transmission is performed through SL, and the second communication scenario is a communication scenario in the NR system in which the transmission is performed through SL.

In an embodiment, the target resource corresponding to the above transient period capability includes: a first time domain resource of the first communication scenario and/or a second time domain resource of the second communication scenario.

In an embodiment, the target resource corresponding to the transient period capability includes: a blank symbol or a guard interval symbol in the first time domain resource of the first communication scenario.

In an embodiment, the transient period capability includes the transient period capability of the first device when the power is turned off, and/or the transient period capability of the first device when the power is turned on.

In an embodiment, the first target resource corresponding to the transient period capability when the power is turned off includes: a third time domain resource of the first communication scenario, and the second target resource corresponding to the transient period capability when the power is turned on includes: the fourth time domain resource of the second communication scenario.

In an embodiment, the capability indication information is further used for indicating the switching period capability corresponding to the first device when switching the time domain resource, and the third target resource corresponding to the switching period capability includes: the third time domain resource of the first communication scenario, or, the fourth time domain resource of the second communication scenario, or the third time domain resource of the first communication scenario and the fourth time domain resource of the second communication scenario.

In an embodiment, the first target resource corresponding to the transient period capability when the power is turned off includes: an interval symbol for transition protection in the third time domain resource of the first communication scenario, and a second target resource corresponding to the transient period capability when the power is turned on includes: the fourth time domain resource of the second communication scenario.

In an embodiment, the capability indication information is further used for indicating the switching period capability corresponding to the first device when switching the time domain resource, and the third target resource corresponding to the switching period capability includes: the interval symbol for transition protection in the third time domain resource of the first communication scenario, or the fourth time domain resource of the second communication scenario, or the interval symbol for transition protection in the third time domain resource of the first communication scenario and the fourth time domain resource of the second communication scenario.

In an embodiment, the first target resource corresponding to the transient period capability when the power is turned off includes: a third time domain resource of the first communication scenario, and the second target resource corresponding to the transient period capability when the power is turned on includes: the third time domain resource of the first communication scenario and the fourth time domain resource of the second communication scenario.

In an embodiment, the capability indication information is further used for indicating the switching period capability corresponding to the first device when switching the time domain resource, and the third target resource corresponding to the switching period capability includes: the third time domain resource of the first communication scenario.

In an embodiment, the first target resource corresponding to the transient period capability when the power is turned off includes: a third time domain resource of the first communication scenario and a fourth time domain resource of the second communication scenario, and the second target resource corresponding to the transient period capability of turning on the power includes: the fourth time domain resource of the second communication scenario.

In an embodiment, the capability indication information is further used for indicating the switching period capability corresponding to the first device when switching the time domain resource, and the third target resource corresponding to the switching period capability includes: the fourth time domain resource of the second communication scenario.

In an embodiment, the first target resource corresponding to the transient period capability when the power is turned off includes: a third time domain resource of the first communication scenario, and the second target resource corresponding to the transient period capability when the power is turned on includes: the third time domain resource of the first communication scenario and the fourth time domain resource of the second communication scenario.

In an embodiment, the capability indication information is further used for indicating the switching period capability corresponding to the first device when switching the time domain resource, and the third target resource corresponding to the switching period capability includes: the third time domain resource of the first communication scenario.

In an embodiment, the first target resource corresponding to the transient period capability when the power is turned off includes: an interval symbol for transition protection in the third time domain resource of the first communication scenario, and a second target resource corresponding to the transient period capability of turning on the power includes: an interval symbol used for transition protection in the third time domain resource of the first communication scenario and the fourth time domain resource of the second communication scenario.

In an embodiment, the capability indication information is further used for indicating the switching period capability corresponding to the switching of the time domain resource by the first device, and the third target resource corresponding to the switching period capability includes: the interval symbol for transitional protection in the third time domain resource of the first communication scenario.

The implementation principle and technical effect of the information transmission apparatus provided by the above-mentioned embodiments are similar to those of the above-mentioned method embodiments, and details are not described herein again.

Figure 6:
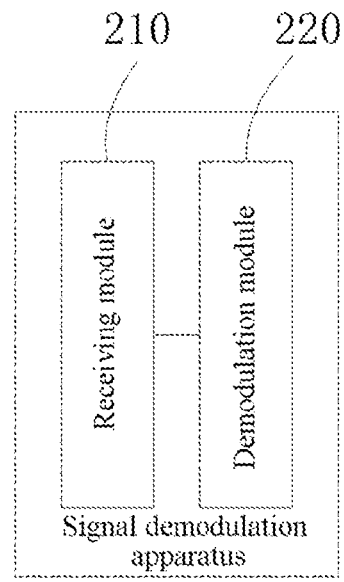
FIG. 6 is a block diagram of an information transmission apparatus provided by an embodiment.

FIG. 6 is a block diagram of an information transmission apparatus in another embodiment. As shown in FIG. 6, the information transmission apparatus includes a receiving module 210 and a demodulation module 220.

The receiving module 210 is configured to receive capability indication information sent by the first device; where the capability indication information is used for indicating a transient period capability supported by the first device to the second device.

The demodulation module 220 demodulates or determines whether to demodulate the signal sent by the first device according to the transient period capability.

In an embodiment, the second device is a network device, and the receiving module 210 is specifically configured to receive the first radio resource control (RRC) signaling sent by the first device, where the first RRC signaling carries the capability indication information.

In an embodiment, the first RRC signaling includes a terminal equipment capability information element, and the capability indication information is carried in the terminal equipment capability information element.

In an embodiment, the receiving module 210 is specifically configured to receive a system message sent by the first device, where the system message carries the capability indication information.

In an embodiment, the second device is a terminal device, and the receiving module 210 is specifically configured to receive a system message sent by the first device through a network device.

In an embodiment, the second device is a terminal device, and the receiving module 210 is specifically configured to receive a system message sent by the first device through a target channel, where the target channel includes a physical sidelink broadcast channel (PSBCH) or a physical sidelink shared channel (PSSCH).

In an embodiment, the second device is a terminal device, and the receiving module 210 is specifically configured to receive, through a network device, the second RRC signaling sent by the first device, where the second RRC signaling carries the capability indication information.

In an embodiment, the demodulation module 220 is specifically configured to determine the second target resource to be demodulated by the second device according to the first target resource corresponding to the transient period capability, and demodulate the signal on the second target resource.

In an embodiment, a portion of the first target resource overlaps a portion of the second target resource.

In an embodiment, the first target resource does not overlap with the second target resource.

In an embodiment, the demodulation module 220 is specifically configured to determine whether to demodulate the signal sent by the first device according to the transient period capability, and the demodulation determination is used to determine whether the second device does not receive and does not demodulate, receive but not demodulate, or receive and partially demodulate the signal on the target resource corresponding to the transient period capability.

The implementation principle and technical effect of the information transmission apparatus provided by the above-mentioned embodiments are similar to those of the above-mentioned method embodiments, and details are not described herein again.

For the specific limitation of the information transmission apparatus, reference may be made to the limitation of the information transmission method above, which will not be repeated here. Each module in the above-mentioned information transmission apparatus may be implemented in whole or in part by software, hardware and a combination thereof. The above modules may be embedded in or independent of the processor in the computer device in the form of hardware, or stored in the memory in the computer device in the form of software, so that the processor can call and execute the operations corresponding to the above modules.

In an embodiment, an electronic device is provided. The electronic device may be an information transmission device, and its internal structure diagram may be as shown in FIG. 10. The electronic device includes a processor, a memory, a network interface and a database connected by a system bus. The processor of the electronic device is used to provide computing and control capabilities. The memory of the electronic device includes a non-volatile storage medium and an internal memory. The non-volatile storage medium stores an operating system, a computer program, and a database. The internal memory provides an environment for the execution of the operating system and the computer program in the non-volatile storage medium. The database of the electronic device is used to store signal demodulation data. The network interface of the electronic device is used to communicate with an external terminal through a network connection. The computer program, when executed by the processor, implements an information transmission method. The display screen of the electronic device may be a liquid crystal display screen or an electronic ink display screen, and the input apparatus of the electronic device may be a touch layer covered on the display screen, or a key, a trackball or a touchpad set on the housing of the electronic device, or may be an external keyboard, trackpad, mouse, or the like.

Figure 7:
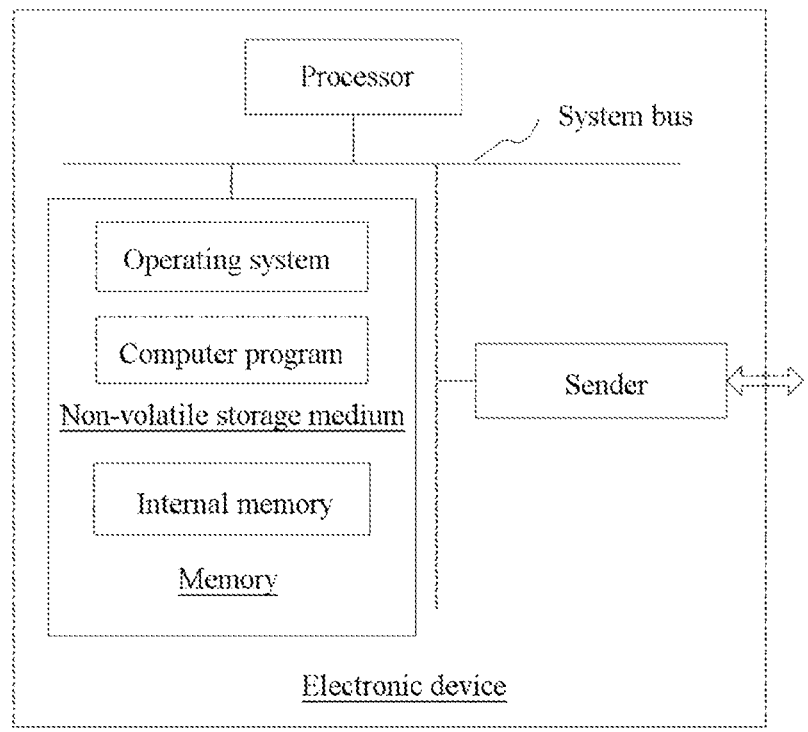
FIG. 7 is a block diagram of a first device provided by an embodiment.

Those skilled in the art can understand that the structure shown in FIG. 7 is only a block diagram of a part of the structure related to the solution of the present application, and does not constitute a limitation on the computer device to which the solution of the present application is applied. In particular, the computer device may include more or fewer components than shown in the figures, or combine certain components, or have a different arrangement of components.

In an embodiment, an electronic device is provided, including a sender, a memory, and a processor, and the memory stores a computer program.

The processor executes the computer program for acquiring scenario information of a first device; where the scenario information is used for indicating a communication scenario corresponding to the first device;

The sender is configured to send capability indication information to the second device according to the scenario information, where the capability indication information is used for indicating a transient period capability supported by the first device.

The implementation principle and technical effect of the electronic device provided by the foregoing embodiment are similar to those of the foregoing method embodiment, and details are not described herein again.

Figure 8:
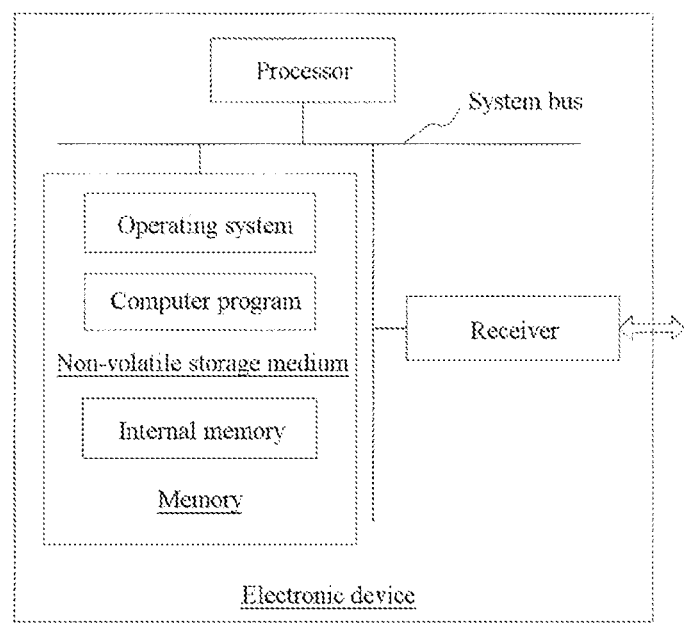
FIG. 8 is a block diagram of a second device provided by an embodiment.

In an embodiment, an electronic device is provided, as shown in FIG. 8, the electronic device includes a receiver, a memory and a processor, and the memory stores a computer program.

The receiver is configured to receive capability indication information sent by a first device; where the capability indication information is used for indicating to a second device a transient period capability supported by the first device; and when the processor executes the computer program, it is configured to demodulate or determine whether to demodulate a signal sent by the first device according to the transient period capability.

The implementation principle and technical effect of the electronic device provided by the foregoing embodiment are similar to those of the foregoing method embodiment, and details are not described herein again.

In an embodiment, a computer-readable storage medium is provided on which a computer program is stored, and when the computer program is executed by a processor, the following steps are implemented:

acquiring scenario information of a first device, where the scenario information is used for indicating a communication scenario corresponding to the first device;

according to the scenario information, sending capability indication information to a second device, where the capability indication information is used for indicating a transient period capability supported by the first device.

The implementation principle and technical effect of the computer-readable storage medium provided by the above-mentioned embodiments are similar to those of the above-mentioned method embodiments, and details are not described herein again.

In an embodiment, a computer-readable storage medium is provided on which a computer program is stored, and when the computer program is executed by a processor, the following steps are implemented:

the second device receiving capability indication information sent by a first device; where the capability indication information is used for indicating to a second device a transient period capability supported by the first device; and demodulating or determining whether to demodulate a signal sent by the first device according to the transient period capability.

The implementation principle and technical effect of the computer-readable storage medium provided by the above-mentioned embodiments are similar to those of the above-mentioned method embodiments, and details are not described herein again.

Those of ordinary skill in the art can understand that all or part of the processes in the methods of the above embodiments can be implemented by instructing relevant hardware through a computer program, and the computer program may be stored in a non-volatile computer-readable storage medium. When the computer program is executed, it may include the processes of the above-mentioned method embodiments. Any reference to memory, storage, database or other medium used in the various embodiments provided in the present application may include non-volatile memory and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, RAM is available in various forms such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM) and so on.

The technical features of the above embodiments can be combined arbitrarily. For the sake of brevity, all possible combinations of the technical features in the above embodiments are not described. However, as long as there is no contradiction in the combination of these technical features, such combinations are considered to be within the scope recorded in the present specification. The above-mentioned embodiments only represent several embodiments of the present application, and the descriptions thereof are relatively specific and detailed, but should not be construed as a limitation on the scope of the patent application. It should be pointed out that for those skilled in the art, without departing from the concept of the present application, several modifications and improvements can be made, which all belong to the protection scope of the present application. Therefore, the protection scope of the patent of the present application shall be subject to the appended claims.

What is claimed is:

1. A method for information transmission, comprising:
   determining scenario information of a first device, wherein the scenario information is used for indicating a communication scenario corresponding to the first device; and
   sending capability indication information to a second device according to the scenario information, wherein the capability indication information is used for indicating a transient period capability and/or a switching period capability supported by the first device,
   wherein the communication scenario comprises a first communication scenario and a second communication scenario corresponding to a first terminal when switching the communication scenario, and wherein the first communication scenario is a communication scenario in a new radio (NR) system in which a signal is transmitted through a first channel on a sidelink (SL), and the second communication scenario is a communication scenario in the NR system in which a signal is transmitted through a second channel on the SL.

2. The method according to claim 1, wherein the switching period capability is used for indicating a duration required for the first device to switch from a time domain resource of the first communication scenario to a time domain resource of the second communication scenario.

3. The method according to claim 1, wherein the sending the capability indication information to the second device according to the scenario information comprises:
when the scenario information indicates that the communication scenario corresponding to the first device is the communication scenario comprising only air interface, sending a first radio resource control (RRC) signaling to the second device, wherein the first RRC signaling carries the capability indication information.

4. The method according to claim 1, wherein the sending the capability indication information to the second device according to the scenario information comprises:
when the scenario information indicates that the communication scenario corresponding to the first device is the communication scenario comprising only sidelink (SL), sending a system message to the second device, wherein the system message carries the capability indication information.

5. A method for information transmission, applied to a second terminal, comprising:
receiving capability indication information sent by a first device; wherein the capability indication information is used for indicating a transient period capability and/or a switching period capability supported by the first device, and the switching period capability is used for indicating a duration required for the first device to switch a time domain resource,
wherein switching the time domain resource indicates that the first device switches from a time domain resource of a first communication scenario to a time domain resource of a second communication scenario, and
wherein the first communication scenario is a communication scenario in a new radio (NR) system in which a signal is transmitted through a first channel on a sidelink (SL), and the second communication scenario is a communication scenario in the NR system in which a signal is transmitted through a second channel on the SL.

6. The method according to claim 5, wherein the receiving the capability indication information sent by the first device comprises:
when the first communication scenario and the second communication scenario are the communication scenarios comprising only air interface, receiving a first radio resource control (RRC) signaling sent by the first device, wherein the first RRC signaling carries the capability indication information.

7. The method according to claim 5, wherein the receiving the capability indication information sent by the first device comprises:
when the first communication scenario and the second communication scenario are the communication scenarios comprising only sidelink (SL), receiving a system message sent by the first device, wherein the system message carries the capability indication information.

8. The method according to claim 5, further comprising:
demodulating or determining whether to demodulate a signal sent by the first device according to the transient period capability and/or the switching period capability.

9. An electronic device, comprising a receiver, a memory and a processor, the memory storing a computer program, wherein
when the computer program is performed by the processor, causes the receiver to receive capability indication information sent by a first device; wherein the capability indication information is used for indicating a transient period capability and/or a switching period capability supported by the first device, and the switching period capability is used for indicating a duration required for the first device to switch a time domain resource,
wherein switching the time domain resource indicates that the first device switches from a time domain resource of a first communication scenario to a time domain resource of a second communication scenario, and
wherein the first communication scenario is a communication scenario in a new radio (NR) system in which a signal is transmitted through a first channel on a sidelink (SL), and the second communication scenario is a communication scenario in the NR system in which a signal is transmitted through a second channel on the SL.

10. The electronic device according to claim 9, wherein the receiver is further configured to:
when the first communication scenario and the second communication scenario are the communication scenarios comprising only air interface, receive a first radio resource control (RRC) signaling sent by the first device, wherein the first RRC signaling carries the capability indication information.

11. The electronic device according to claim 9, wherein the receiver is further configured to:
when the first communication scenario and the second communication scenario are the communication scenarios comprising only sidelink (SL), receive a system message sent by the first device, wherein the system message carries the capability indication information.

* * * * *